July 1, 1924.  
O. F. BUNN  
TRAP  
Filed Aug. 22, 1923

O. F. Bunn
INVENTOR
BY Victor J. Evans
ATTORNEY

WITNESS:

July 1, 1924.
O. F. BUNN
1,500,050
TRAP
Filed Aug. 22, 1923    2 Sheets-Sheet 2
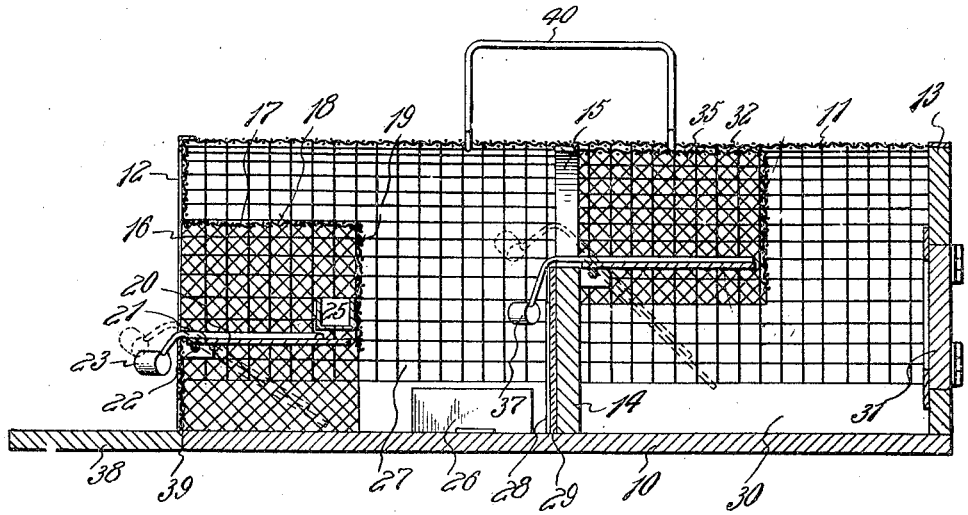
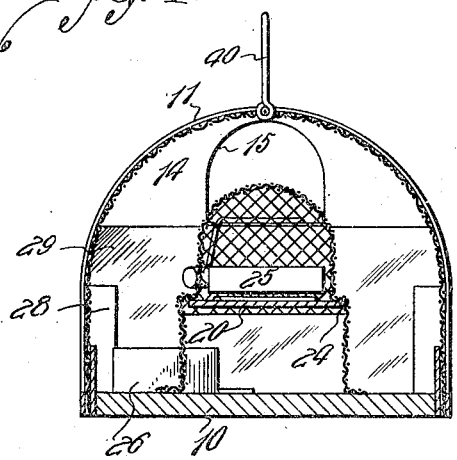
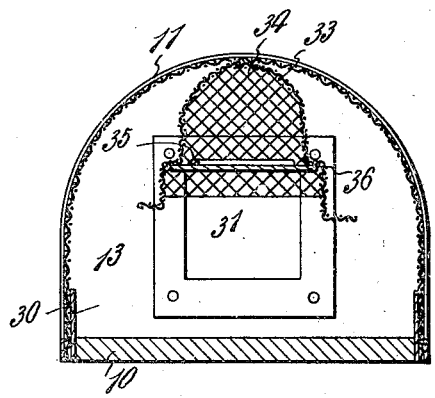
O. F. Bunn
INVENTOR
BY Victor J. Evans
ATTORNEY Patented July 1, 1924.

1,500,050

UNITED STATES PATENT OFFICE.

ORRICE F. BUNN, OF BRISTOL, TENNESSEE.

TRAP.

Application filed August 22, 1923. Serial No. 658,817.

*To all whom it may concern:*

Be it known that I, ORRICE F. BUNN, a citizen of the United States, residing at Bristol, in the county of Sullivan and State of Tennessee, have invented new and useful Improvements in Traps, of which the following is a specification.

This invention relates to animal traps and has for an object the provision of a trap especially adapted for catching rats, mice and other animals.

An object of the present invention is the provision of an animal trap which is designed so as to entice one or more animals therein, the construction and arrangement being such as to eliminate all sense of danger, so that the animals may be captured singly or in numbers.

The invention also aims to provide a novel construction and arrangement of entrance compartments, having means for admitting the animals and for automatically closing the compartments against escape, the walls of the compartments being constructed to provide closure stops, so that the closures will open in one direction only.

With the above and other objects in view, the invention further includes the following novel features and details of construction, to be hereinafter more fully described, illustrated in the accompanying drawings and pointed out in the appended claim.

In the drawings:—

Figure 3 is a longitudinal section showing by dotted lines the tilted positions of the platforms.

Figure 4 is a transverse sectional view through one end of the trap and showing the entrance compartment.

Figure 5 is a like view through the other compartment.

Figure 1:
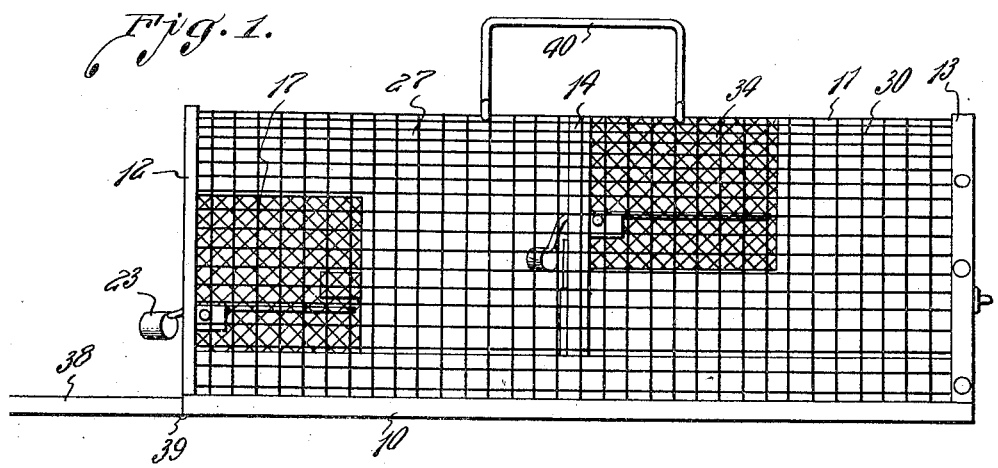
Figure 1 is a side elevation of an animal trap constructed in accordance with the invention.
Figure 2:
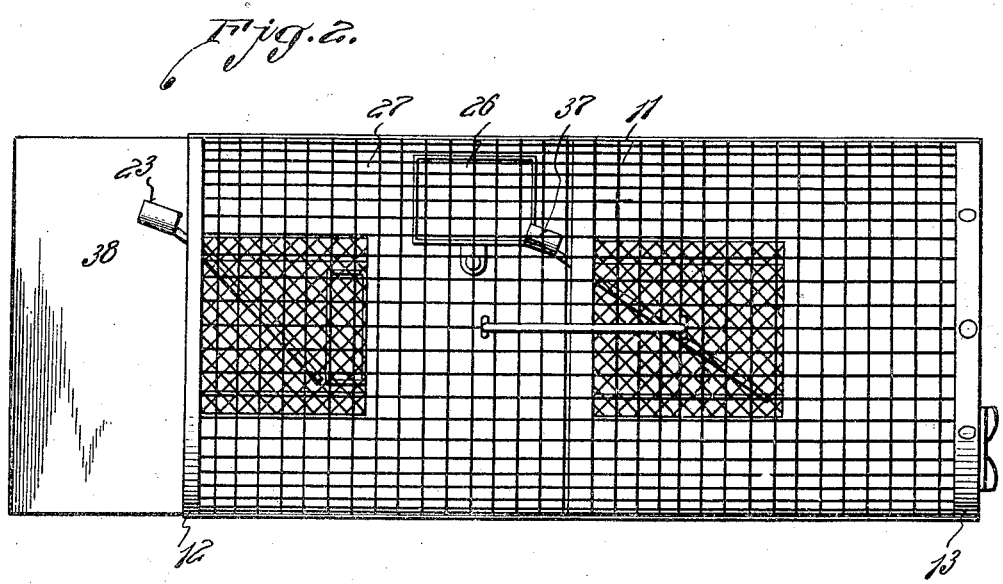
Figure 2 is a top plan view.

Referring to the drawings in detail wherein like characters of reference denote corresponding parts, the trap which constitutes the present invention is formed of a cage-like structure and includes a solid base or bottom 10, curved top and side walls 11 and end walls 12 and 13, the former forming the front end of the trap. The trap is divided by a transverse partition 14 and this partition and the front wall 12 are each provided with an opening indicated at 15 and 16 respectively, the lower edges of the openings being spaced above the base 10.

Surrounding the opening 16 is an entrance compartment 17, the latter including side and top walls 18 and an end wall 19. Located within the compartment 17 is a platform 20 which is pivotally mounted as shown at 21, the said platform extending inwardly from the lower edge of the opening 16 and forming a bottom for the entrance compartment 17. Secured to and extending from the platform 20 is an arm 22 having a weight 23 at the outer end thereof, the said weight serving to automatically raise the platform. The side walls of the compartment 17 are offset to provide stop shoulders 24 which are arranged substantially on the same plane as the lower edge of the opening 16, while the rear wall 19 of the said compartment terminates slightly below the platform so as to provide an opening from the compartment 17 into the chamber at one side of the partition 14.

A bait container 25 is located within the entrance compartment, while a water container 26 is located within the adjacent chamber, which may be referred to as the entrance chamber and indicated by the numeral 27.

Also located within the entrance chamber and secured to the partition by means of flanges 28 which are carried by said partition is a mirror 29.

The chamber upon the opposite side of the partition may be referred to as the exit chamber and indicated by the reference character 30, one wall of this chamber being provided with a door 31 which may be opened for the passage of captured animals.

Located within the chamber 30 and extending inwardly from the opening 15 is a compartment 32 which includes side and top walls 33 and an end wall 34. The bottom of the compartment 32 is formed by a pivotally mounted platform 35 which engages stop shoulders 36 formed by offset portions in the side walls 33 and this platform is normally held in closed position upon substantially the same plane as the lower edge of the opening 15 by means of a weighted arm 37. The end wall of the compartment 32 terminates slightly below the platform.

The trap may be provided at one end with a platform 38 which is hingedly secured thereto as shown at 39 so as to aid the animal in reaching the opening 16 when the trap is set upon a slight elevation. The trap may be further provided with a handle or bail 40 for convenience in carrying.

An animal attracted to the trap through the scent of the bait or the water within the entrance chamber, will see his reflection in the mirror 29 so that it will appear that another animal is already within the trap and his suspicion will be disarmed. The animal will enter through the opening 16 and his weight upon the platform 20 will cause the platform to tilt downwardly and inwardly so that the said animal will be percipitated into the entrance compartment, whereupon the platform will automatically close and his escape prevented. In his attempt to escape, the animal will pass through the opening 15 and his weight upon the platform 35 will cause him to drop into the chamber 30, the automatic closing of the platform 35 effectually cutting off his retreat. He may be removed from the compartment 30 through the door 31.

The invention is susceptible of various changes in its form, proportions and minor details of construction and the right is herein reserved to make such changes as properly fall within the scope of the appended claim.

Having described the invention what is claimed is:—

An animal trap embodying a cage having an entrance opening therein, a transverse partition dividing the cage into separate chambers, said partition also having an opening therein, a compartment located within each chamber around the openings, said compartments being closed at their tops, sides and rear, a pivotally mounted automatically closed platform within and providing a bottom for each compartment, offset portions in the side walls of said compartments, said portions defining stop shoulders for the platform, a mirror secured to the rear wall of one chamber and an exit door for the other chamber.

In testimony whereof I affix my signature.

ORRICE F. BUNN.